United States Patent
Boivin et al.

(10) Patent No.: US 6,257,654 B1
(45) Date of Patent: Jul. 10, 2001

(54) AIR DRAG REDUCING APPARATUS

(75) Inventors: Mathieu Boivin, Westmount; Karic Roberge, Montréal, both of (CA)

(73) Assignee: Maka Innovation Technologique Inc., Quebec (CA)

(*) Notice: Subject to any disclaimer, the term of this patent is extended or adjusted under 35 U.S.C. 154(b) by 0 days.

(21) Appl. No.: 09/644,751

(22) Filed: Aug. 23, 2000

(30) Foreign Application Priority Data

Aug. 24, 1999 (CA) .................................................. 2281064

(51) Int. Cl.[7] .................................................. B62D 35/00
(52) U.S. Cl. ..................................... 296/180.5; 296/180.4
(58) Field of Search .......................... 296/180.4, 180.1, 296/180.2, 180.3, 180.5

(56) References Cited

U.S. PATENT DOCUMENTS

| 4,214,787 | 7/1980 | Chain ................................. 296/1 S |
| 4,451,074 | 5/1984 | Scanlon . |
| 4,458,936 | 7/1984 | Mulholland . |
| 5,498,059 | 3/1996 | Switlik ........................... 296/180.4 X |

Primary Examiner—Joseph D. Pape
(74) Attorney, Agent, or Firm—Merchant & Gould P.C.

(57) ABSTRACT

An air drag reducing apparatus for use with a vehicle having a rear end closed by a pair of doors consists of a rectangular shaped panel having a leading edge hingedly connected to the vehicle, the panel extending at about 15 degrees relative to the rearward projection of a side of the vehicle. An element positions the panel in a drag reducing position; this element is such that it allows the panel to be moved between the door and the side of the vehicle as the door is opened and moved to a position adjacent the side of the vehicle. As the door is moved back from the opened position to a closed position, the element causes the panel to return to its drag reducing position. The rear of a vehicle may include two side panels with or without two top panels.

29 Claims, 8 Drawing Sheets

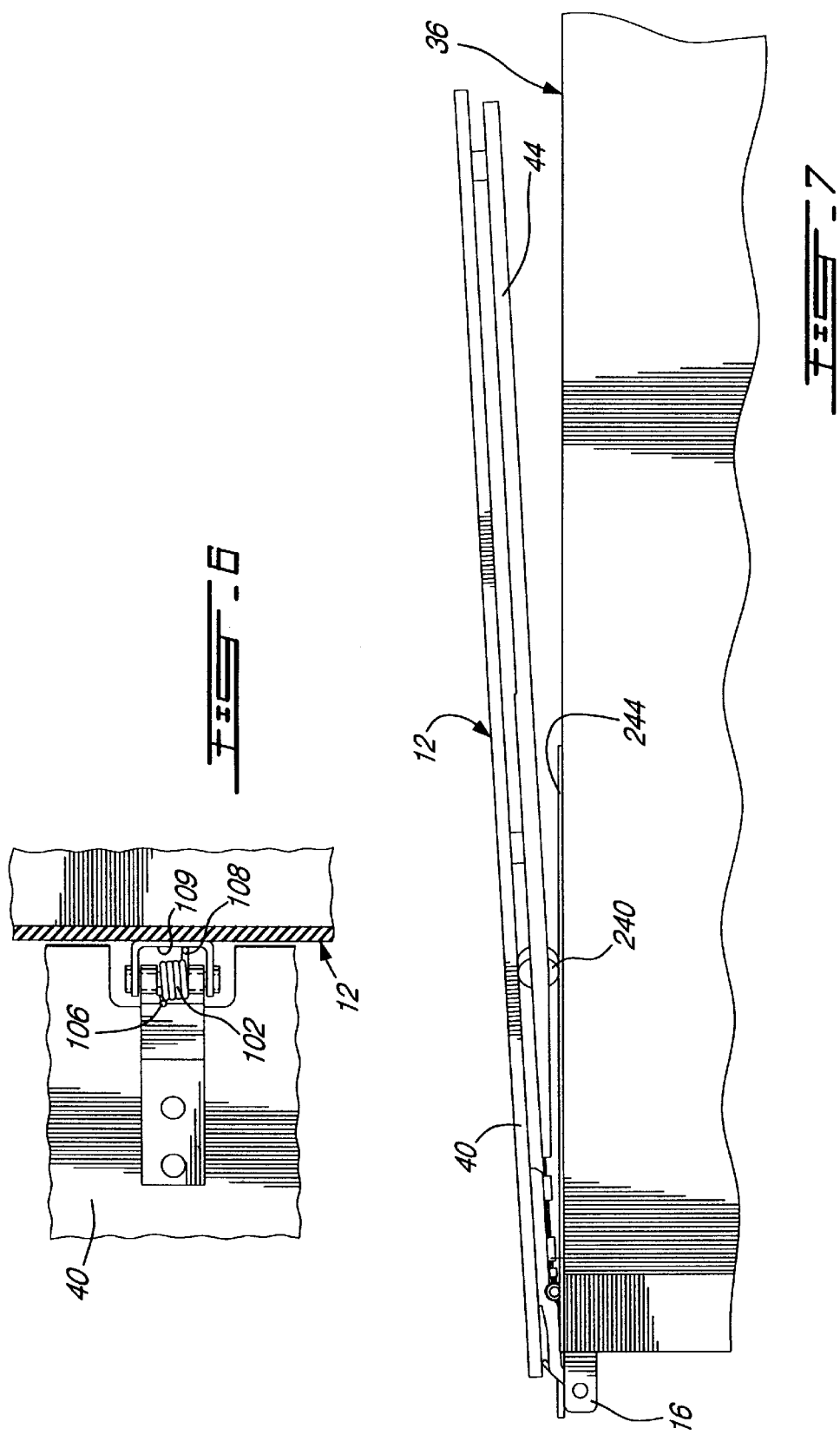

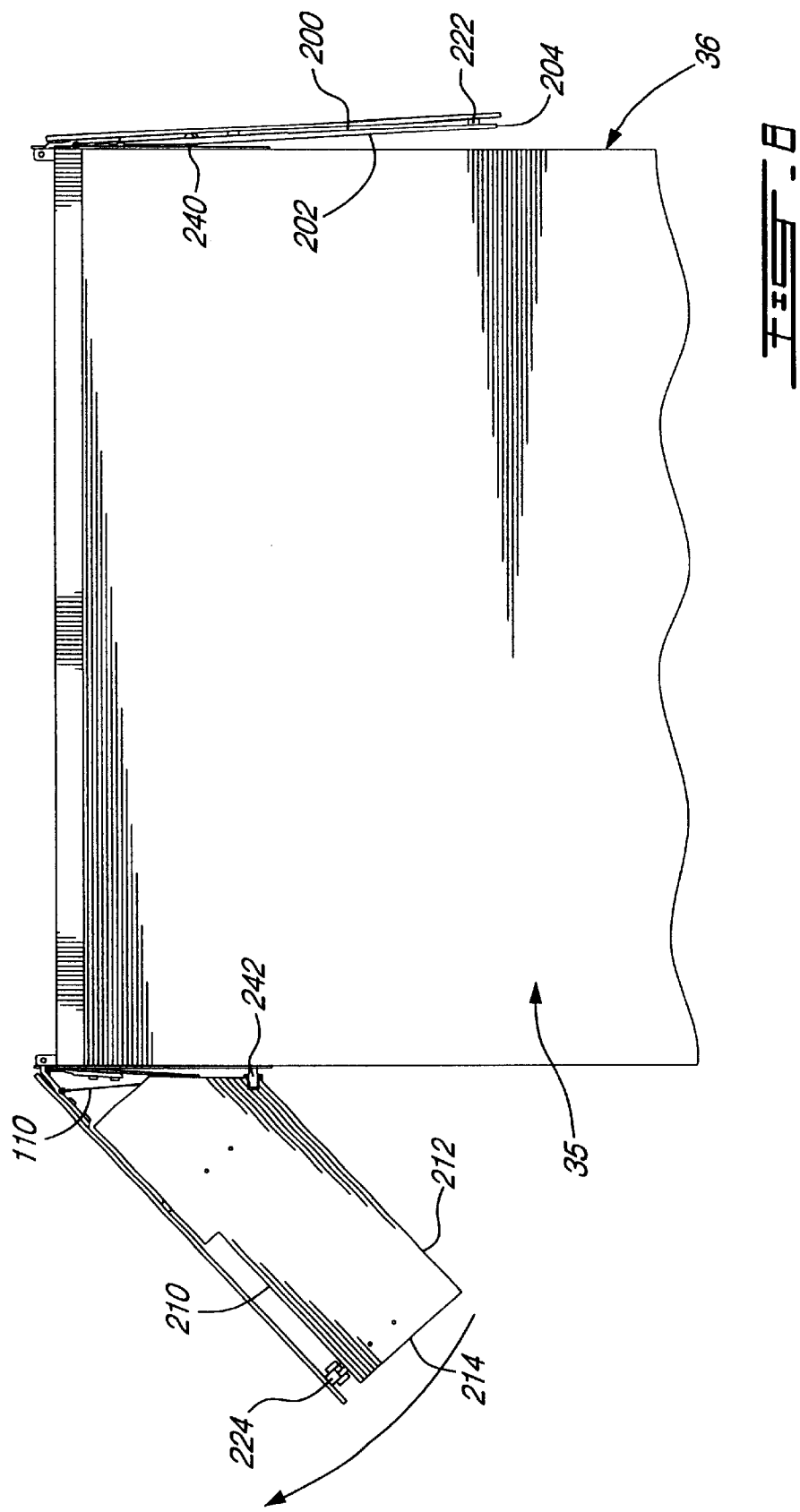

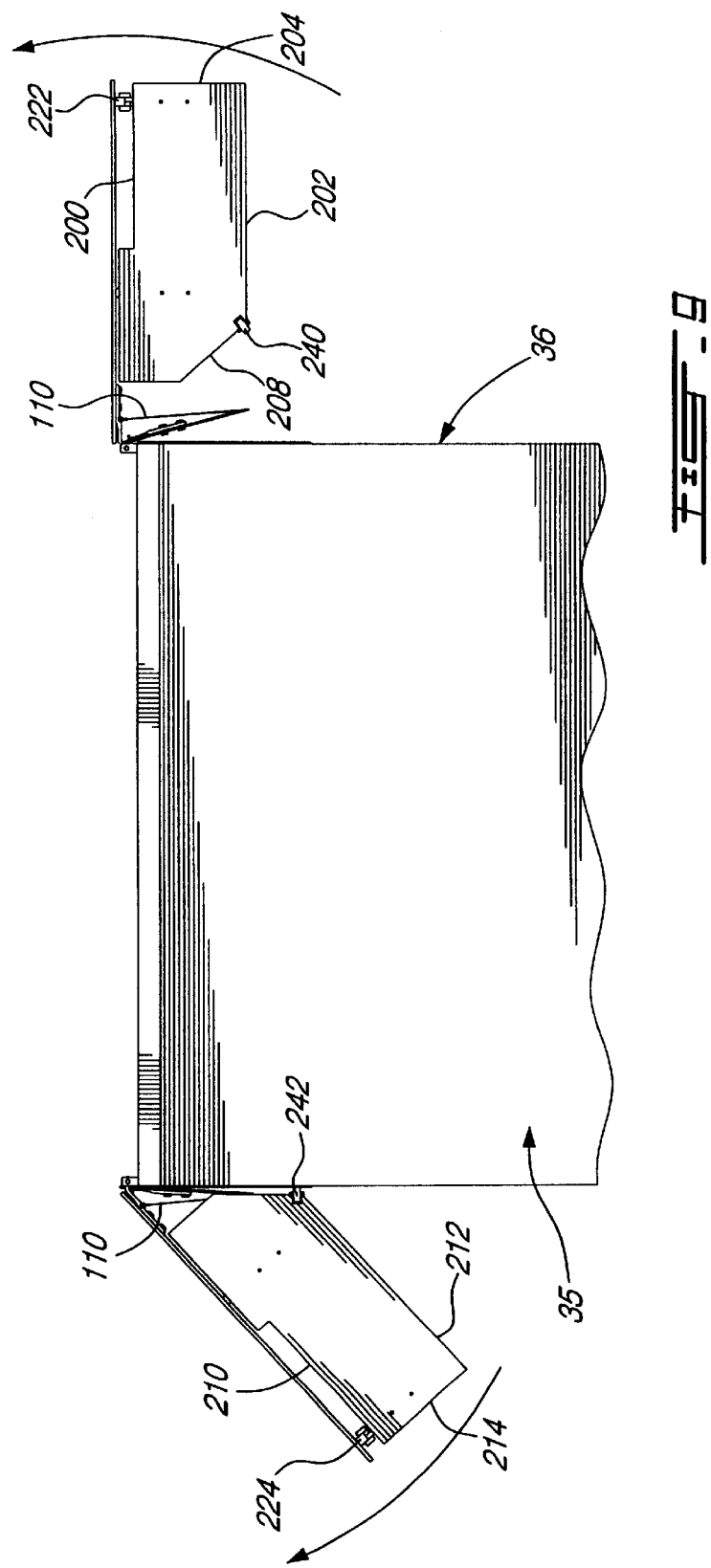

AIR DRAG REDUCING APPARATUS

FIELD OF THE INVENTION

The present invention relates to an air drag reducing apparatus for use with vehicles having a rectangular rear end closed by a pair of hingedly mounted doors.

BACKGROUND OF THE INVENTION

It is known that a significant amount of air drag results when a vehicle travels over a roadway; this is due to an area of low pressure created at the rear end of the vehicle. For example, with a tractor-trailer type vehicle, the air makes a sharp bend around the squared-off back of the trailer, thus causing turbulence and drag. To overcome this problem, engine power is required and therefore fuel. Furthermore, the turbulence also causes poor visibility in rainy conditions and an accumulation of dirt on the back of trailers.

In the trucking industry, the aerodynamics of vehicles is a growing concern. Tests indicate that fuel savings from aerodynamic improvements are equivalent to fuel savings attained by a chassis weight reduction and require fewer services to maintain. The air resistance or aerodynamic drag of the vehicle increases the power needed by the engine as the speed increases. It is known that a tractor-trailer needs about 100 HP to overtake the air drag at a speed of 55 MPH. Approximately half the energy reaching the drive wheels is required to overcome air resistance at cruising speed. Recent tests reveal that the square back end contributes approximately to 30% of the air drag. Therefore, the addition of aerodynamic device, such as a rear defector, diminishes the air drag and results in lower fuel consumption.

Various devices have been proposed to reduce air drag.

One air reducing apparatus may be found described in U.S. pat. No. 4,214,787 issued Jul. 29, 1980 to Chain wherein a pair of trim panels are pivotally connected to the rear end of the vehicle with control means connected between each trim panel and the rear end of the vehicle for maintaining the trim panel in an upward position when the vehicle is moving at a rate exceeding a pre-determined minimum velocity. The drag reducing apparatus described in this patent includes a control assembly, which automatically controls the movement of the trim panels between an operating position and a storage position adjacent the vehicle doors. The control system comprises a panel actuator in the form of a ram, which is responsible to the application of pressurized fluid or air by the operator of the vehicle to maintain the panel in the drag reducing position. However, in this drag apparatus, the ram construction does not enable the doors to be moved between a closed position to a completely opened position where the doors are adjacently parallel to the sides of the trailer vehicle.

OBJECTS AND STATEMENT OF THE INVENTION

The present invention is concerned with providing an air drag reducing apparatus which overcomes the above-described problem.

More specifically, this is achieved by providing an apparatus which allows the panels to be moved outwardly from a drag reducing position to a position where the doors are in their fully retracted position adjacent their associated sides of the vehicle.

A further object of the present invention is to provide a mechanism which will enable the panels to return back to their drag reducing position whenever the doors are hingedly moved from their retracted position to their end closing position. This is achieved by providing a pressure exerting element which assists the panel to return to its drag reducing position.

The present invention therefore relates to an air drag reducing apparatus for use with a vehicle having top and opposite lateral sides contiguous with a rear end formed of a pair of hingedly mounted rectangular doors movable between a closed position to an open position wherein said doors panels are respectively retracted adjacent to a corresponding side of the vehicle; the apparatus comprising:

an elongated generally rectangular panel having opposite short sides and opposite long sides, the long sides defining a leading edge and a trailing edge;

hinge means connecting the panel for pivotal movement relative to the vehicle; and means associated with the panel for positioning the panel in a drag reducing position rearwardly of a corresponding closed door wherein the panel defines an angle of about 15° with the rearward projection of the plane of the corresponding side of the vehicle; the positioning means allowing said panel to be moved between the door and the vehicle side as the door is opened and moved to its retracted position.

In one preferred form of the invention, the positioning means consist of springs mounted to the hinges of the panels.

In another form of the invention, the positioning means consist of gas cylinders connected between the door and the top panel.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 6 is an enlarged view of the spring means for positioning the panel in an air drag reducing position;

FIG. 7 is a top plan view showing a door with one side and one top panel in the opened position; and FIGS. 8 and 9 are top plan views showing various positions of the two doors and their top and side panels in a door returning motion.

DESCRIPTION OF PREFERRED EMBODIMENTS

Figure 1:
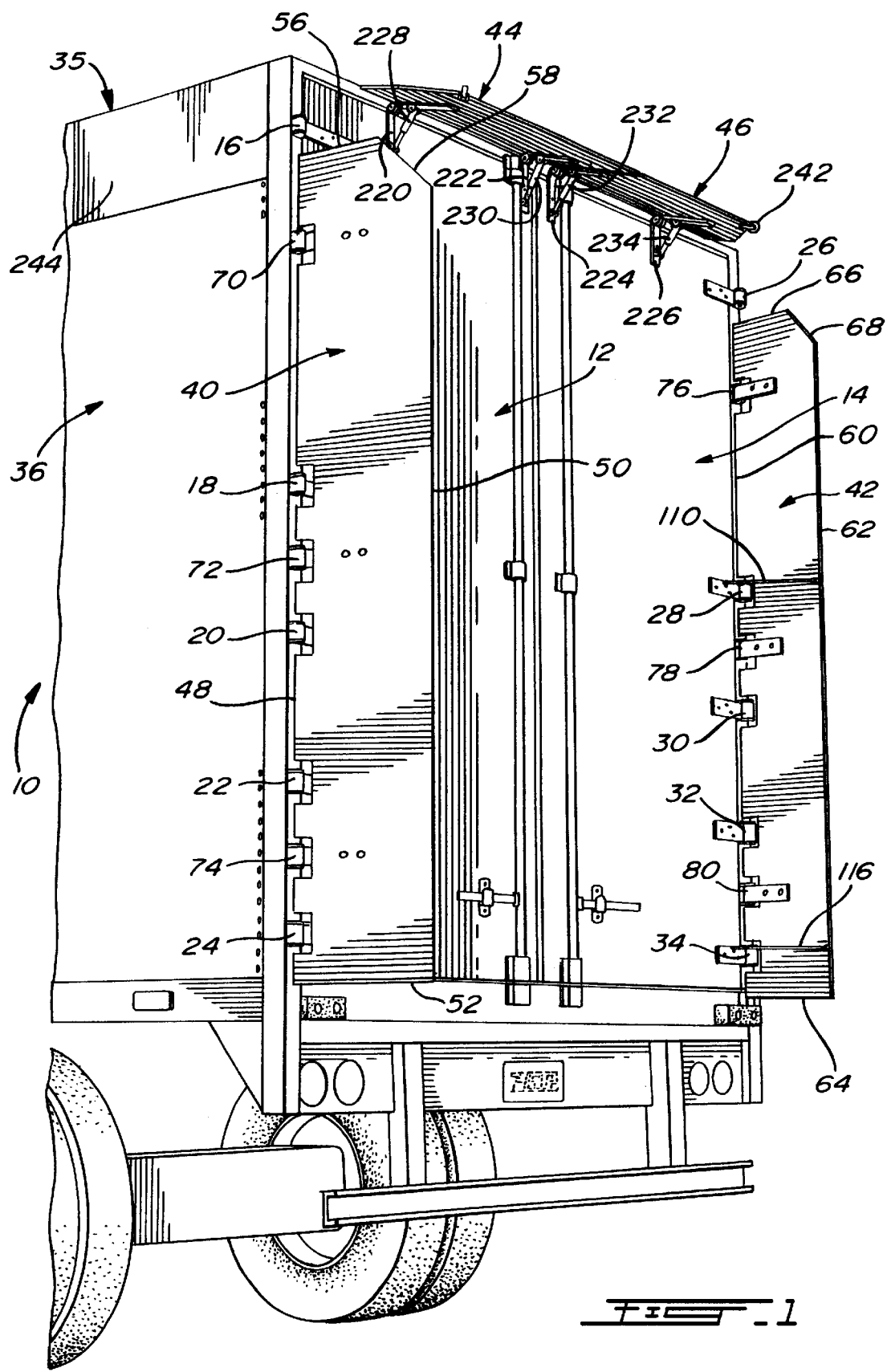
FIG. 1 is a perspective view showing the rear of a vehicle equipped with a series of air drag apparatuses made in accordance with the present invention.

Referring to FIG. 1, there is shown the rear end of a vehicle 10, such as a truck or a trailer, which is closed by a pair of doors 12 and 14 of rectangular shape. The doors are respectively mounted by means of hinges 16, 18, 20, 22, 24 on one side and 26, 28, 30, 32 and 34 on the other side so as to move from their shown closed position to a fully retracted position where they are disposed parallel and adjacent to the opposite sides 36 and 38 of the vehicle.

The present invention is concerned with providing, at the rear of vehicle, an air drag reducing apparatus which in the present case includes a pair of side panels 40 and 42 and, as explained and described hereinbelow, may also include a pair of top panels 44 and 46. Panel 40 has a generally elongated rectangular shape with a leading edge 48 and a trailing edge 50 (defining the long sides of the rectangle) and a pair of opposite sides 52 and 56 (defining the short sides of the rectangle). The upper short side 56 has a chamfered corner 58. Similarly, the side panel 42 has a leading edge 60 and a trailing edge 62 defining the long sides of the generally rectangular panel and opposite short sides 64 and 66 representing the short sides of the panel, the upper horizontal short side 66 having a chamfered corner 68. These panels are preferably made of metal, such as aluminum.

Panel 40 is pivotally mounted to the corner of the vehicle by means of three hinges 70, 72 and 74, while panel 42 is pivotally mounted to the rear end of the vehicle by means of three hinges 76, 78 and 80.

Figure 3:
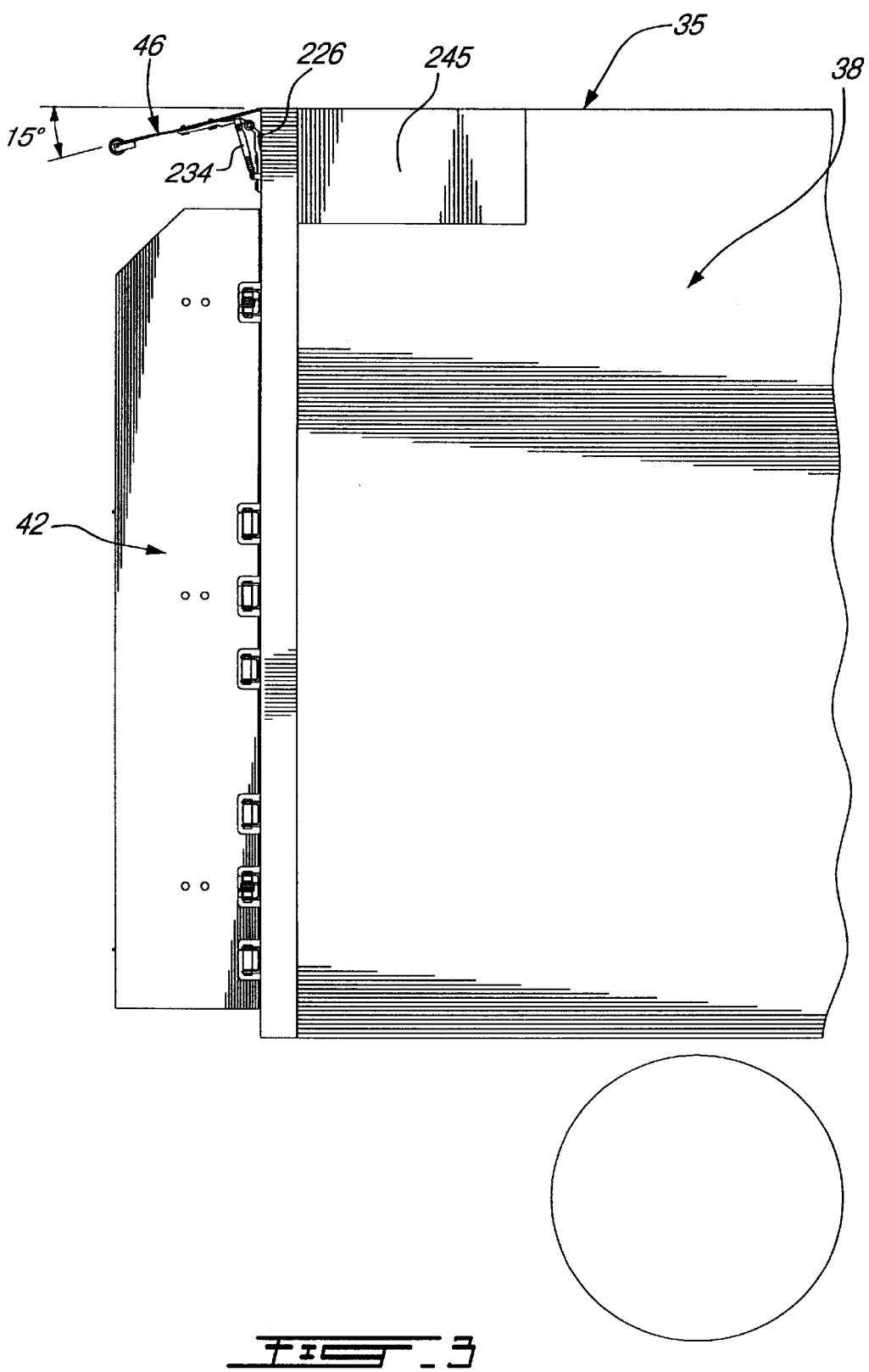
FIG. 3 is an elevational side view of the rear of the vehicle showing one side panel and one top panel.

The air drag reducing apparatus of the present invention includes means for positioning the panels at a preferred drag reducing position rearwardly of a corresponding closed panel at an angle of preferably about 15° with the rearward projection of the plane of the corresponding side of the vehicle; FIG. 3 shows this angle with respect to the top side 35 of the vehicle while FIG. 4 shows this angle with respect to the lateral side 36 of the vehicle.

A first embodiment of the air drag reducing apparatus of the present invention will be described with respect to the side panels 40 and 42. It should be understood, however, that both panels are equipped with the same elements for positioning them in the desired angle degree; therefore, a description will only be given for panel 40 since its application to the other panel 42 is identical.

Figure 4:
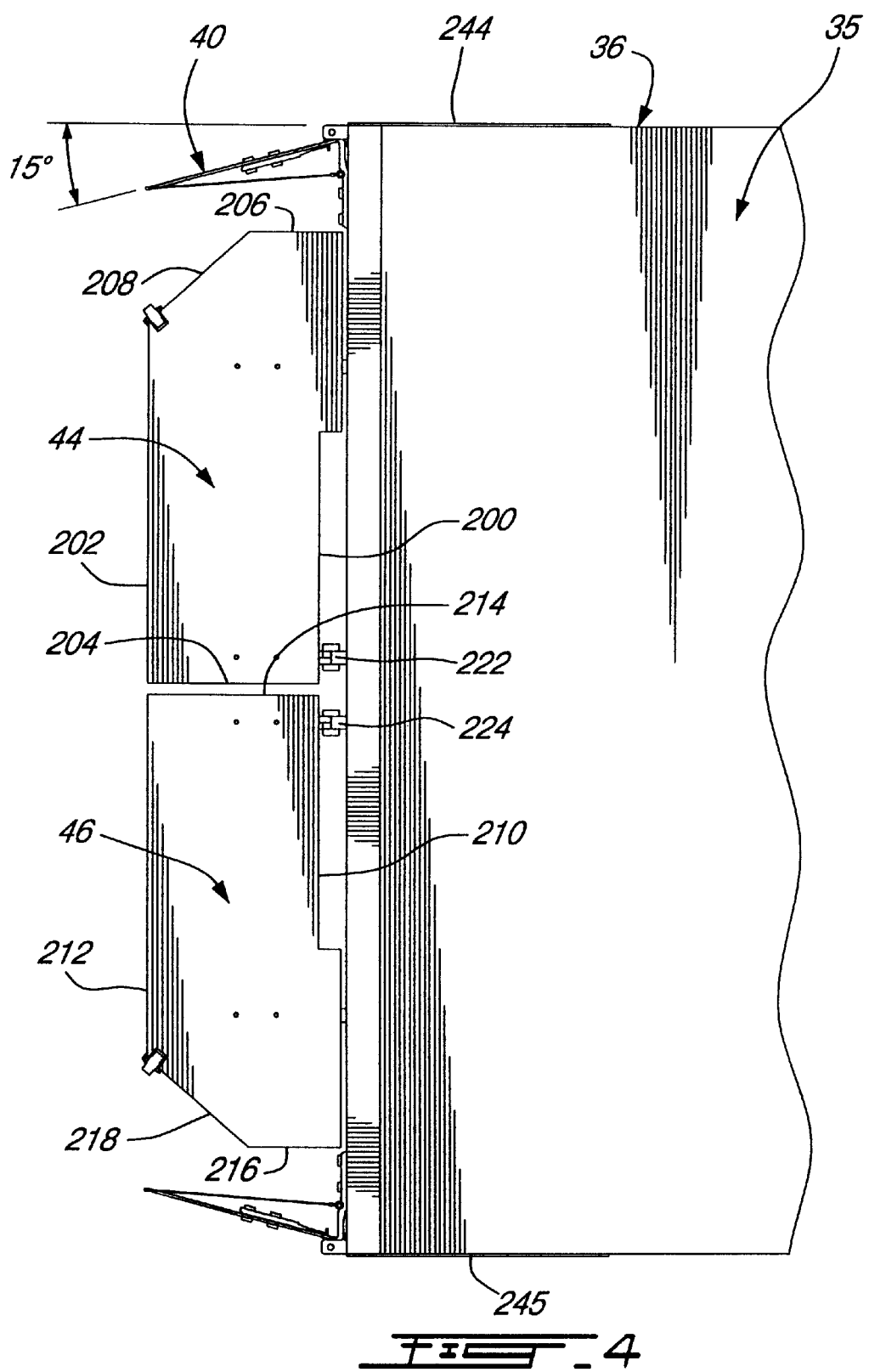
FIG. 4 is a top plan view of the rear of the vehicle and its panels.
Figure 5:
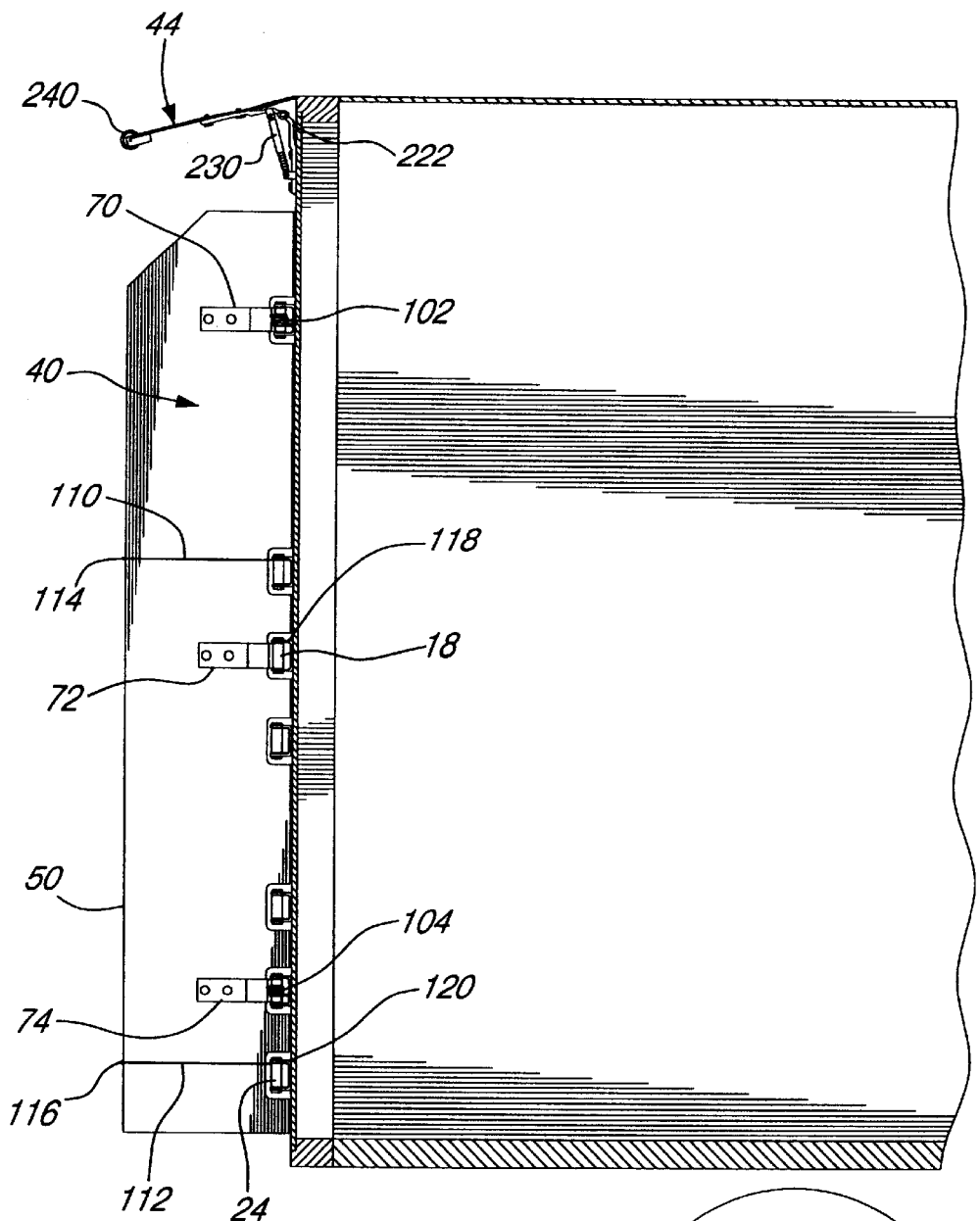
FIG. 5 is an elevational side view of the rear of the vehicle with one side panel removed for clarity purposes.

Referring to FIGS. 3, 4 and 5, the means for positioning panel 40 in its preferred drag reducing position, consists of a pair of coil springs 102 and 104 mounted at hinges 70 and 74. If needed, a third coil spring could be mounted at hinge 72; however, it has been found that a pair of coil springs is sufficient to achieve the air drag reducing portion of the panel.

As detailed in FIG. 6, the coil spring 102 has one end 106 contacting the inner wall of panel 40 and the opposite 108 contacting the hinge bracket 109. This spring is tensioned so that the spring end 106 will force the panel 40 by the pressure of the hinge into the drag reducing position. It is noted that during the travel of the vehicle, there is a vacuum exerted on the panel forcing it to maintain its drag reducing position. However, at low speeds, vibration may exist and, in one preferred form of the invention, a pair of cables 110 and 112 is used to counteract the outward pressure exerted on the panel either by the vacuum or either by springs 102 and 104. The cables have their respective ends 114 and 116 mounted to the trailing edge 50 of the panel and its opposite ends 118 and 120 mounted to the door hinges 18 and 24 respectively.

The air drag reducing apparatus of the present invention is so constructed as to allow the panel to move outwardly whenever the door 12 is opened and moved to its fully retracted position against the side 36 of the vehicle (see FIG. 7). As the door 12 is opened, it reaches a position where it contacts panel 40, releasing the latter from its spring pressure and, together, the door and panel are moved to the fully retracted position with the panel lies substantially parallel to the door and to the side of the vehicle. In this position, the two cables 110 and 112 are slack. Means (not shown) are provided to secure the door in its side retracted position. When it is wished to return the door to its closed position, the securing means are disconnected and the door is manually pushed rearwardly. At a given intermediate position, the opposite ends of the springs contact their respective contact points and pressure begins to build in the springs thereby preventing the panel from reaching the door closed position. Again, the springs and the cables ensure the proper angle position of the panel relative to the closed door.

A vehicle may be equipped with the side panels described above with or without top panels. However, to increase drag reduction, it is preferable to mount top panels 44 and 46 with drag reducing features of the present invention.

Figure 2:
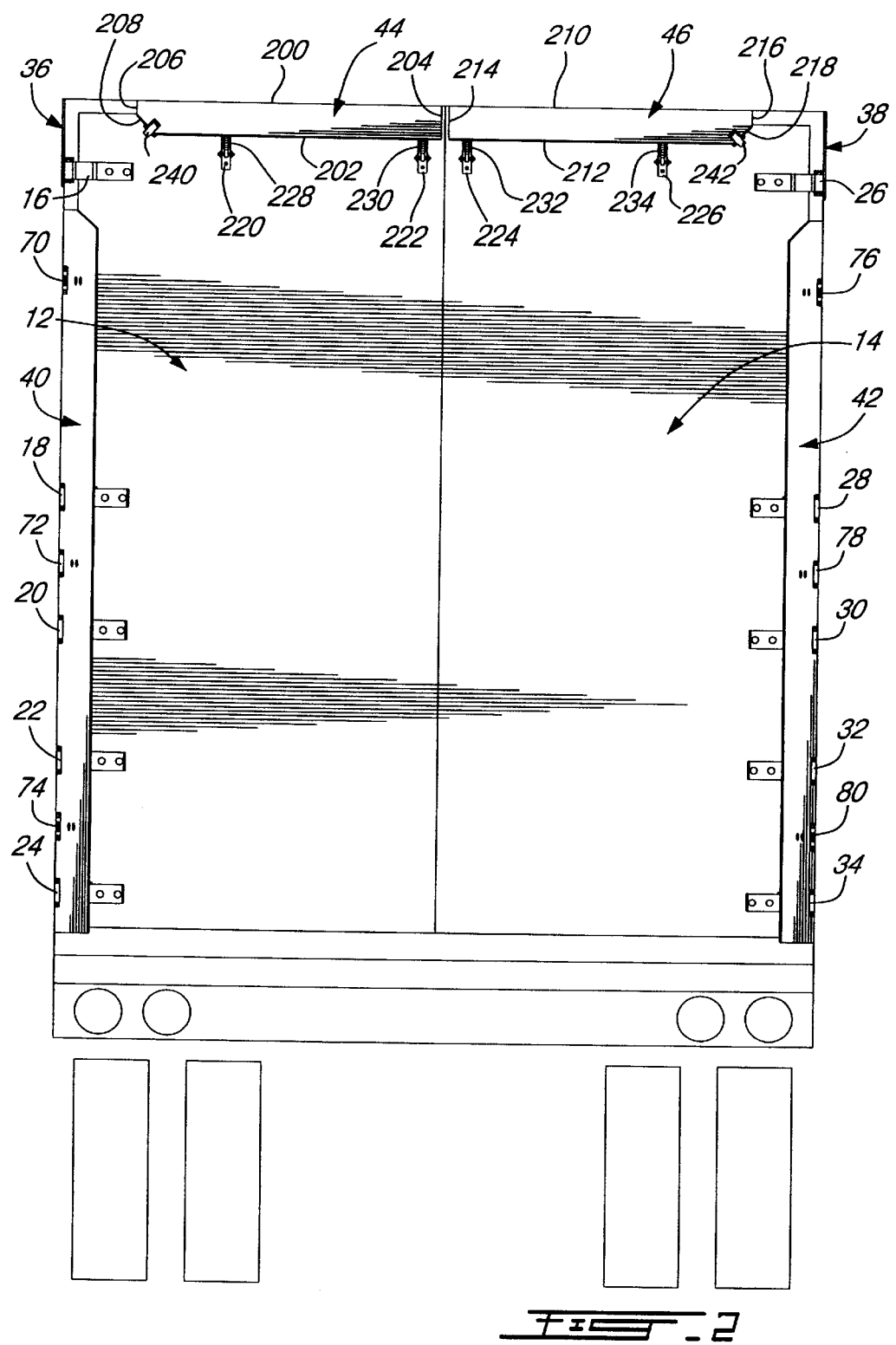
FIG. 2 is an elevational rear view of the vehicle and its panels.

Therefore, with reference to FIGS. 2 and 4, the top panel 44 has a generally rectangular shape with a leading edge 200 and a trailing edge 202 forming the long sides of the panel and a pair of short sides 204 and 206, the latter having a chamfered corner 208. Similarly, panel 46 has a rectangular shape with a leading edge 210 and a trailing edge 212 forming the long sides of the panel and a pair of opposite short sides 214 and 216, the latter displaying a chamfered corner 218.

Referring also to FIG. 1, these panels 44 and 46 are each pivotally mounted to their respective doors 12 and 14 by means of a pair of hinges 220 and 222 (for panel 44) and 224 and 226 (for panel 46).

The air drag reducing apparatus of this embodiment of the present invention consists of a pair of gas (inert or air) cylinders 228 and 230 for panel 44 and a pair of gas (inert or air) cylinders 232 and 234 for panel 46. Once again, a description will only be given for one top panel as it should be understood that the other panel is identically constructed with a similarly arranged drag reducing apparatus.

In the air drag reducing position illustrated in FIG. 1, all gas cylinders are in their extended positions. When door 12 is opened, the top panel is also moved sideways remaining in its angle position until it contacts the lateral side of the vehicle. In a preferred form of the invention, the chamfered corner includes a roller 240 (for panel 44) and 242 (for panel 46) which will roll down the lateral side of the vehicle. To prevent damage to the side of the vehicle, a plate 244 (245 for the opposite vehicle side 38) is preferably mounted to the corner of the lateral side of the vehicle; this plate is made of strong material, such as metal. By forcing the door towards the lateral side of the vehicle, panel 44 is downwardly pivoted by means of its hinges 220 and 222 thereby compressing the cylinders 228 and 230. Hence, in the fully retracted position, there is a pressure exerted on the top panel by the cylinders and, consequently, on the door forcing it to return to its closed position. Thus, as mentioned above, means are provided to enable the vehicle operator to secure the door against the lateral side of the vehicle whenever it is wished to maintain the door in the fully retracted position. Once these securing means are released, the pressure of the cylinders forces the door back to its closed position and simultaneously raises the top panel to its drag reducing position where the cylinders reach their fully extended condition. This force exerted by the cylinders also reduces the manual pressure exerted by the operator in returning the doors to the closed position.

Although the invention has been described with respect to two forms of the invention, it will be evident to the person skilled in the art that it may be modified and refined in various ways. For example, the spring system used for positioning the side panels 40 and 42 in their drag reducing position could be replaced by cylinders such as those described above with respect to the operation of the top panels 44 and 46. Similarly, the cylinder system used for panels 44 and 46 could be used for panels 40 and 42. It is therefore wished to have it understood that the present invention should not be limited in scope, except by the terms of the following claims.

What is claimed is:

1. An air drag reducing apparatus for use with a vehicle having top and opposite lateral sides contiguous with a rear end formed of a pair of hingedly mounted rectangular doors movable between a closed position to an open position wherein said doors are respectively retracted adjacent to a corresponding side of the vehicle; said apparatus comprising:

an elongated generally rectangular panel having opposite short sides and opposite long sides, said long sides defining a leading edge and a trailing edge;

hinge means connecting said panel for pivotal movement relative to said vehicle; and means associated with said panel for positioning said panel in a drag reducing position rearwardly of a corresponding closed door wherein said panel defines an angle of about 15° with the rearward projection of the plane of the corresponding side of the vehicle; said positioning means allowing said panel to be moved between said door and said vehicle side as said door is opened and moved to said retracted position and causing, as said door is movingly returned for closure, said panel to return to said drag reducing position.

2. An air drag reducing apparatus as defined in claim 1, wherein said panel has its leading edge extending parallel to a vertical edge of said door adjacent said vehicle side.

3. An air drag reducing apparatus as defined in claim 2, wherein said positioning means consist of spring means having one end contacting said door and an opposite end contacting said panel.

4. An air drag reducing apparatus as defined in claim 3, wherein said spring means are coil springs mounted to said hinge means.

5. An air drag reducing apparatus as defined in claim 3, wherein said positioning means further comprise cable means having one end connected to said panel and an opposite end connected to said door to assist said spring means to retain said panel in said drag reducing position.

6. An air drag reducing apparatus as defined in claim 2, wherein said rectangular panel has a chamfered corner extending from said trailing edge to an upper horizontal short side thereof.

7. An air drag reducing apparatus defined in claim 1, wherein said panel has its leading edge extending parallel to an upper horizontal edge of said rear end of said vehicle.

8. An air drag reducing apparatus as defined in claim 7, wherein said positioning means consist of gas cylinders having one end fixed to said door and opposite end fixed to said panel.

9. An air drag reducing apparatus as defined in claim 7, wherein said panel includes roller means rollingly contacting the side of the vehicle as the door is moved to said retracted position.

10. An air drag reducing apparatus as defined in claim 7, wherein said rectangular panel has a chamfered corner extending from said trailing edge to a vertical short side thereof.

11. An air drag apparatus as defined in claim 1, wherein said short sides of said rectangular panel have a width of about eighteen inches.

12. An air drag apparatus as defined in claim 1, wherein said panel is made of aluminum.

13. An air drag reducing apparatus for use with a vehicle having top and opposite lateral sides contiguous with a rear end formed of a pair of hingedly mounted rectangular doors movable between a closed position to an open position wherein said doors are respectively retracted adjacent to a corresponding side of the vehicle; said apparatus comprising:

an elongated generally rectangular panel having opposite short sides and opposite long sides, said long sides defining a leading edge and a trailing edge;

hinge means connecting said panel for pivotal movement relative to said vehicle; and pressure applying means associated with said panel for positioning said panel in a drag reducing position rearwardly of a corresponding closed door wherein said panel defines an angle of about 15° with the rearward projection of the plane of the corresponding side of the vehicle; said pressure applying means being inoperative as said door is opened and moved to said retracted position to allow said panel to be moved between said door and said vehicle side wherein, as said door is movingly returned for closure, said pressure applying means are rendered operative to set said panel in said drag reducing position.

14. An air drag reducing apparatus as defined in claim 13, wherein said panel has its leading edge extending parallel to a vertical edge of said door adjacent said vehicle side.

15. An air drag reducing apparatus as defined in claim 14, wherein said pressure applying means consist of spring means having one end contacting a vehicle part and an opposite end contacting said panel.

16. An air drag reducing apparatus as defined in claim 15, wherein said spring means are coil springs mounted to said hinge means.

17. An air drag reducing apparatus as defined in claim 15, further comprising cable means having one end connected to said panel and an opposite end connected to said door to assist said spring means in positioning said panel in said drag reducing position.

18. An air drag reducing apparatus as defined in claim 14, wherein said rectangular panel has a chamfered corner extending from said trailing edge to an upper horizontal short side thereof.

19. An air drag apparatus as defined in claim 13, wherein said short sides of said rectangular panel have a width of about eighteen inches.

20. An air drag apparatus as defined in claim 13, wherein said panel is made of aluminum.

21. An air drag reducing apparatus for use with a vehicle having top and opposite lateral sides contiguous with a rear end formed of a pair of hingedly mounted rectangular doors movable between a closed position to an open position wherein said doors are respectively retracted adjacent to a corresponding side of the vehicle; said apparatus comprising:

an elongated generally rectangular panel having opposite short sides and opposite long sides, said long sides defining a leading edge and a trailing edge;

hinge means connecting said panel for pivotal movement relative to said vehicle; and compressible means associated with said panel for positioning said panel in a drag reducing position rearwardly of a corresponding closed door wherein said panel defines an angle of about 15° with the rearward projection of the plane of the corresponding side of the vehicle; said compressible means being compressed as said door is opened and moved to said retracted position wherein said panel is moved between said door and said vehicle side and wherein, as said door is movingly returned for closure, said compressible means are decompressed causing said panel to return to said drag reducing position.

22. An air drag reducing apparatus as defined in claim 21, wherein said panel has its leading edge extending parallel to a vertical edge of said door adjacent said vehicle side.

23. An air drag reducing apparatus as defined in claim 22, wherein said rectangular panel has a chamfered corner extending from said trailing edge to an upper horizontal short side thereof.

24. An air drag reducing apparatus defined in claim 21, wherein said panel has its leading edge extending parallel to an upper horizontal edge of said rear end of said vehicle.

25. An air drag apparatus as defined in claim 24, wherein said compressible means are mounted to said hinge means.

26. An air drag reducing apparatus as defined in claim 24, wherein said panel includes roller means rollingly contacting the side of the vehicle as the door is moved to said retracted position.

27. An air drag reducing apparatus as defined in claim 24, wherein said rectangular panel has a chamfered corner extending from said trailing edge to a vertical short side thereof.

28. An air drag apparatus as defined in claim 21, wherein said short sides of said rectangular panel have a width of about eighteen inches.

29. An air drag apparatus as defined in claim 21, wherein said panel is made of aluminum.

* * * * *